US008169623B2

(12) United States Patent
McComas et al.

(10) Patent No.: US 8,169,623 B2
(45) Date of Patent: May 1, 2012

(54) OPTICAL APPARATUS AND METHOD FOR MEASURING THE ATTITUDE OF AN OBJECT IN OUTER SPACE

(75) Inventors: Brian Keith McComas, Tucson, AZ (US); Kent P. Pflibsen, Tucson, AZ (US); Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 333 days.

(21) Appl. No.: 12/552,182

(22) Filed: Sep. 1, 2009

(65) Prior Publication Data

US 2011/0051149 A1    Mar. 3, 2011

(51) Int. Cl.
*G01B 11/14* (2006.01)
(52) U.S. Cl. ............... 356/614; 356/139.01; 250/203.6
(58) Field of Classification Search ............... 356/614, 356/139.01, 121; 359/399, 7, 728, 419
See application file for complete search history.

(56) References Cited

U.S. PATENT DOCUMENTS

| 4,187,422 | A | * | 2/1980 | Zoltan | 250/252.1 |
| 5,046,824 | A | * | 9/1991 | Pepper | 349/17 |
| 6,108,594 | A | * | 8/2000 | Didinsky et al. | 701/13 |
| 6,450,455 | B1 | * | 9/2002 | Davis | 244/171 |
| 6,580,567 | B1 | | 6/2003 | Lindner | |
| 2003/0081952 | A1 | | 5/2003 | Geng | |
| 2005/0213096 | A1 | * | 9/2005 | Kouris et al. | 356/388 |
| 2008/0024871 | A1 | * | 1/2008 | Achal et al. | 359/615 |

OTHER PUBLICATIONS

Lindner, Jeffrey L., et al., "Single-Camera Panoramic-Imagaing Systems," NASA Tech Briefs—Single-Camera Panoramic-Imaging Systems, Oct. 1, 2007, Marshall Space Flight Center, Alabama.

* cited by examiner

*Primary Examiner* — Tarifur Chowdhury
*Assistant Examiner* — Isiaka Akanbi
(74) *Attorney, Agent, or Firm* — Renner, Otto, Boisselle & Sklar, LLP (57) ABSTRACT

An optical apparatus and method for measuring the attitude of an object in outer space includes an optical system having an aperture to receive optical radiation and a focal plane to image the optical radiation and an aperture-sharing element attached to the optical element and at least partially surrounding an optical path into the aperture. The aperture-sharing element directs optical radiation from a field of view of the aperture-sharing element to a corresponding first portion of the focal plane to provide multi-axis stellar attitude measurements, and the aperture receives optical radiation along the optical path into the aperture and directs the optical radiation to a second portion of the focal plane.

25 Claims, 4 Drawing Sheets

OPTICAL APPARATUS AND METHOD FOR MEASURING THE ATTITUDE OF AN OBJECT IN OUTER SPACE

FIELD OF THE INVENTION

The present invention relates to an optical apparatus for measuring the attitude of an object, and more particularly to an optical apparatus for measuring the attitude of an object in outer space while simultaneously imaging an object of interest.

DESCRIPTION OF THE RELATED ART

Satellites often have an optical system, such as a telescope, for observing targets in space. As a satellite moves or drifts in orbit, the telescope may end up being pointed at something other than the desired target. By measuring the changes in the attitude (e.g., roll, pitch, and yaw) of the satellite as it drifts, it is possible to make adjustments to keep the telescope pointed in the desired direction.

An optical apparatus, such as a star tracker, can be used to measure the changes in the attitude of the satellite by providing measurements of multiple non-collinear astrophysical objects (e.g., roll, pitch and yaw measurements relative to a star field). Conventional star trackers generally have a stationary camera that is aimed at a particular portion of the star field. As the satellite drifts in orbit, the positions of the stars in images from the camera will change. The changes in the attitude of the satellite can be determined by comparing the positions of stars in two different images from the camera. For example, if the satellite is drifting, the position of the same star will change from image to image. By measuring or quantifying these changes, it is possible to determine how the attitude of the satellite has changed and how to compensate for the movement to keep the telescope aimed in the desired direction.

A single camera on a star tracker generally can be used to obtain two of the three attitude measurements (e.g., roll and pitch, roll and yaw, or pitch and yaw). A second camera generally is needed to measure all three components of attitude. Usually, the second camera is aimed at a different portion of the star field, for example, by mounting the cameras orthogonally relative to one another.

SUMMARY OF THE INVENTION

A conventional star tracker may weigh between 5-10 pounds. In larger sized satellites, for example satellites that are 1-2 tons in weight, the use of a star tracker does not appreciably affect the weight of the satellite. On smaller satellites, however, the star trackers can consume a large proportion of the overall weight of the satellite. For example, in a 50-pound satellite, a 5-10 pound star tracker would account for 10-20% of the overall weight of the satellite. The weight of multiple star trackers in addition to the weight of the optical system for imaging a target object, therefore, can consume a substantial proportion of the overall weight of the satellite.

The optical apparatus described herein provides a single, common focal plane for simultaneously imaging a star field and a target object. Light from peripheral portions of the star field is directed to corresponding peripheral portions of the focal plane while light from the target object is directed to a center portion of the focal plane. The light from the peripheral portions of the star field is used to provide multi-axis stellar attitude information for measuring and/or tracking the attitude of the satellite relative to a star field. By combining the star tracking functionality and the imaging functionality into a single optical apparatus, fewer components are needed and the overall weight of the satellite can be reduced. For example, rather than multiple focal plane and sensor packages, a single focal plane and sensor may be used.

According to one aspect, the optical apparatus includes an optical system having an aperture to receive optical radiation and a focal plane to image the optical radiation. The optical apparatus has an aperture-sharing element attached to the optical element and at least partially surrounding an optical path into the aperture. The aperture-sharing element directs optical radiation from a field of view of the aperture-sharing element to a corresponding portion of the focal plane to provide multi-axis stellar attitude measurements from different locations of outer space.

According to another aspect, the optical apparatus includes an optical system that has an aperture and a focal plane, the focal plane having a center portion for imaging optical radiation received along a central optical path and a peripheral portion for imaging optical radiation from a peripheral field of view, and an aperture-sharing element connected to the optical element and at least partially surrounding the central optical radiation path, the aperture-sharing element directing optical radiation from the peripheral field of view to the peripheral portion of the focal plane.

According to another aspect, a method measuring the attitude of an object in outer space includes receiving optical radiation from a peripheral field of view and directing optical radiation from the peripheral field of view to a first portion of a focal plane with an aperture-sharing element that at least partially surrounds an aperture of an optical apparatus, receiving optical radiation along a central optical path through the aperture of the optical apparatus and directing the optical radiation to a second portion of the focal plane, imaging the optical radiation from the peripheral field of view at the first portion of the focal plane and imaging the optical radiation from the central optical path at the second portion of the focal plane, and providing multi-axis stellar attitude measurements with the optical radiation imaged at the first portion of the focal plane.

The foregoing and other features of the invention are hereinafter fully described and particularly pointed out in the claims, the following description and the annexed drawings setting forth in detail several illustrative embodiments of the invention, such being indicative, however, of but a few of the various ways in which the principles of the invention may be employed.

BRIEF DESCRIPTION OF THE DRAWINGS

In the annexed drawings, which are not necessarily to scale.

DETAILED DESCRIPTION

Figure 1:
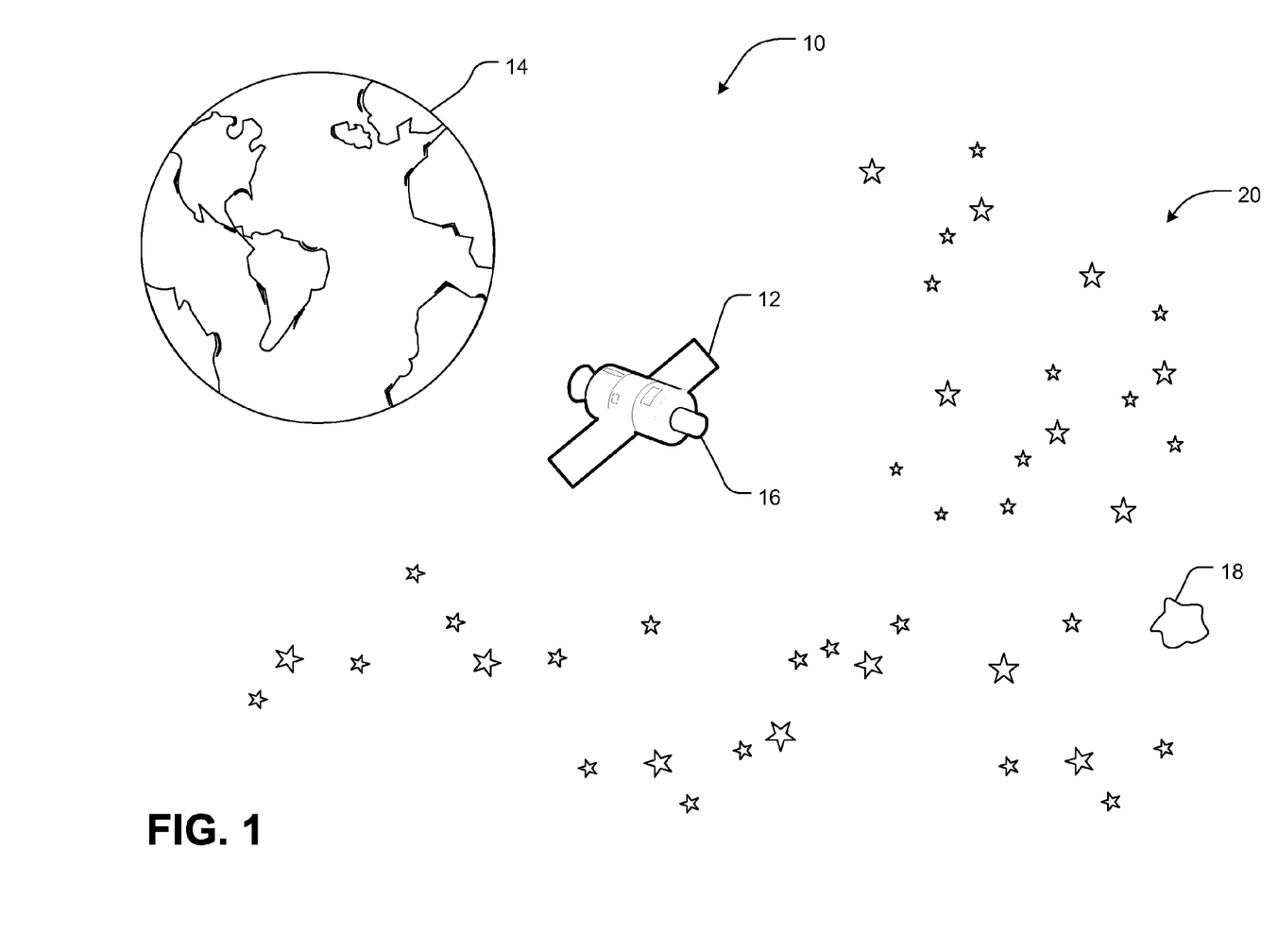
FIG. 1 is a schematic environmental representation of a satellite in orbit.

Referring initially to FIG. 1, an exemplary environmental view of a system 10 includes a satellite 12 in orbit around the Earth 14. The satellite 12 includes an optical apparatus 16 for imaging a target object 18 and a star field 20. Although illustrated using a satellite 12, it will be appreciated that the concepts described herein are applicable to other objects in outer space, including non-orbiting spacecraft or spacecraft orbiting other planets or objects.

With additional reference to FIG. 2-5, the optical apparatus 16 includes an optical system 22, which has an aperture 24 for receiving optical radiation (also referred to as "light") along an optical path 26. The light received along the optical path 26 may include light from the target object 18. For convenience, the optical path 26 is described below as a central optical path. It will be appreciated that the description of the optical path 26 as a central optical path is exemplary and that the optical path 26 may include other paths through the aperture, such as an angled optical path or an optical path that is not central to the aperture.

The optical apparatus 16 also includes an aperture-sharing element 28 attached to the optical system 22 at or near the aperture 24 for receiving light from a field of view of the aperture-sharing element, for example, peripheral portions 20a-c of the star field 20. For convenience, the field of view of the aperture-sharing element is described below as peripheral portions 20a-c of the star field 20. It will be appreciated that this description of the field of view of the aperture-sharing element is exemplary and that the field of view of the aperture-sharing element may include light from other areas including or instead of the peripheral portions 20a-c.

The light received by the optical apparatus 16 is directed to a common focal plane 30 where the light can be imaged and/or be analyzed with a sensor. The light from the peripheral portions 20a-c of the star field 20 is directed by the aperture-sharing element 28 to a first portion of the focal plane 30, and the light received by the optical system 22 is directed to a second portion of the focal plane 30. In one embodiment, the first portion of the focal plane 30 includes portions or areas 30a-c corresponding to the peripheral portions 20a-c of the star field 20 and the second portion of the focal plane 30 includes a center portion 30d. It will be appreciated that these examples are exemplary in nature and that the first portion and the second portion may include different areas than those described.

Figure 5:
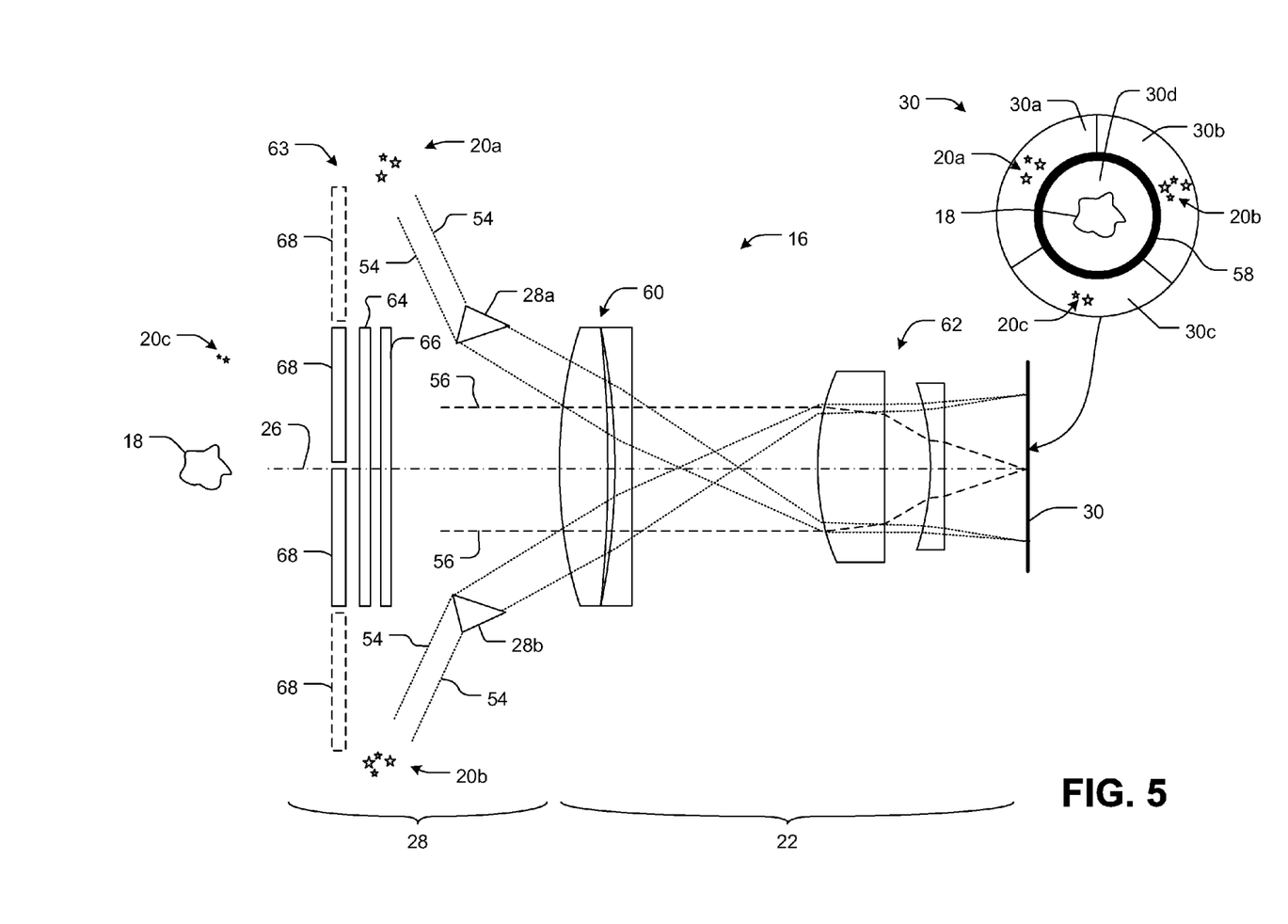
FIG. 5 is a schematic sectional view of another embodiment of an optical apparatus.

As shown in FIG. 5, for example, the light from the field of view of the aperture-sharing element (e.g., light from the peripheral portions 20a-c of the star field 20) is directed to peripheral portions or areas 30a-c of the focal plane 30 and light from the target object 18 (e.g., light from the central optical path 26) is directed to a center portion 30d of the focal plane 30. The focal plane 30 is used to simultaneously image the target object 18 and the peripheral portions 20a-c of the star field 20. The light received along the central optical path 26 is directed to the central portion 30d of the focal plane 30 to image the target object 18. The light from the peripheral portions 20a-c of the star field 20 is used to track stars and to measure changes in the attitude of the satellite 12.

The optical apparatus 16 described herein reduces the overall weight of the satellite 12 by using the common optical system 22 for both imaging a target object 18 and for imaging the star field 20 to track or to measure the attitude of the satellite 12. The reduction in weight is beneficial for use in all satellites, especially smaller satellites where space and weight may be limited.

For example, in the example of a 50-pound satellite having two 5-pound star trackers and a 5-pound optical system, the total weight of the satellite dedicated to imaging an object and measuring the attitude of the satellite is 15 pounds, or 30% of the overall weight of the satellite. The weight of the star tracker can be reduced or eliminated by using the common optical system 22 and aperture-sharing element 28 described herein. In an example in which the aperture-sharing element 28 weighs about 1-2 pounds, the total weight of the equipment for imaging the target object 18 and tracking the star field 20 would be 5-7 pounds, or 10-14% of the overall weight of the satellite. Thus, in this example, using the optical apparatus 16 described herein would result in a significant reduction in the overall weight of the satellite. Accordingly, using the optical apparatus 16 may allow for the manufacture of lighter-weight satellites and/or for the mounting of additional components or instruments on the satellite, thereby expanding the satellite's functionality and capability.

As will be appreciated, the weights provided in the example above are exemplary and used to illustrate how the overall weight of the satellite can be reduced with the optical apparatus described herein. The actual weights of the various components may be different than those described in the example above.

Figures 2, 3A, 3B:
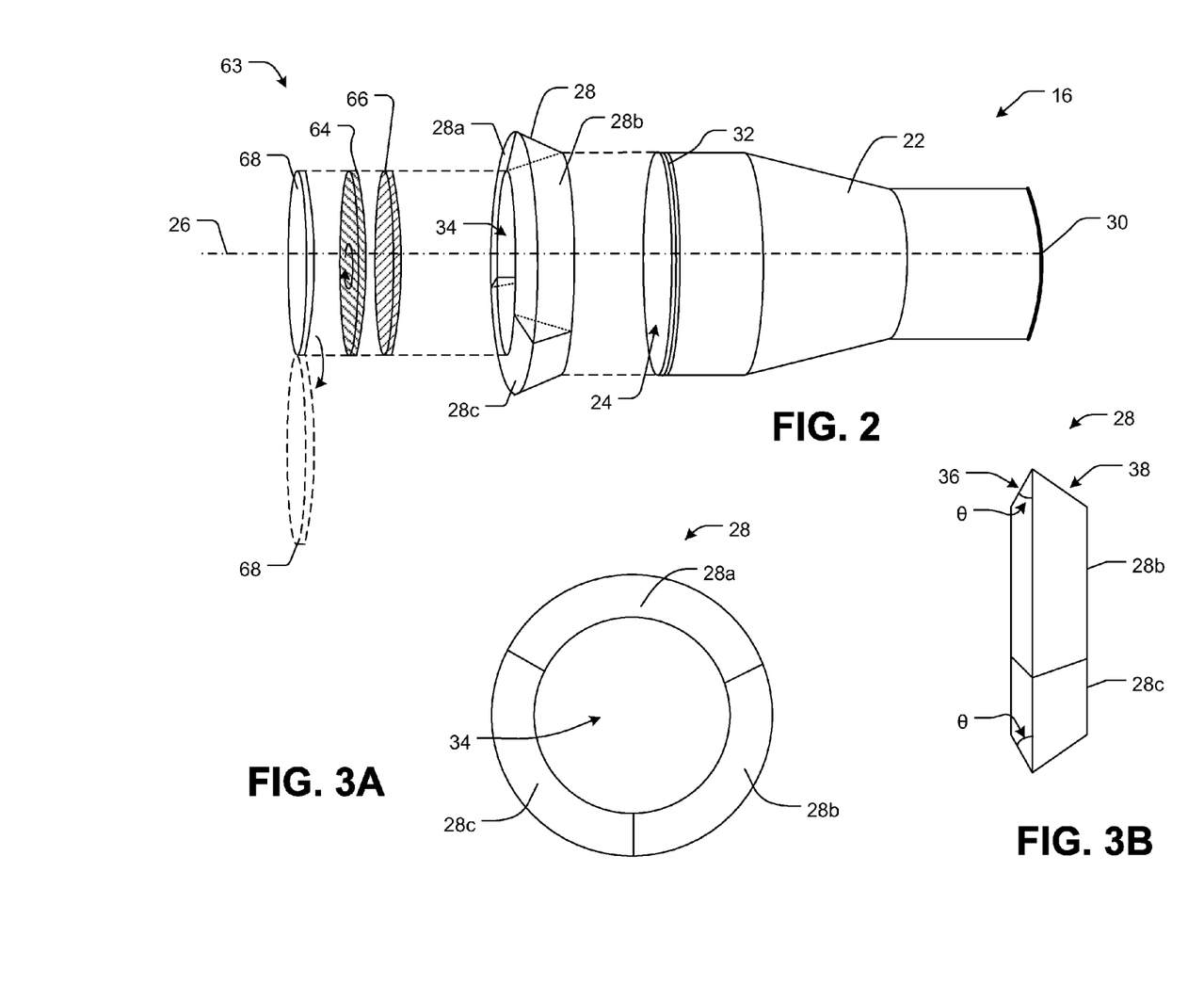
FIG. 2 is an exploded view of an optical apparatus for simultaneously imaging a star field and a target object at a common focal plane.
FIG. 3A is a front view of an exemplary aperture-sharing element.
FIG. 3B is a side view of the exemplary aperture-sharing element of FIG. 3A.

An exploded view of the optical apparatus 16 is shown in FIG. 2. The optical apparatus 16 includes the optical system 22 and the aperture-sharing element 28. The optical system 22 includes the aperture 24, which receives light from the target object 18 along an optical path 26. As shown in the example of FIG. 2, the optical path 26 is a central optical path through the aperture 24.

The light from the target object 18 is directed to the focal plane 30 by the optical system 22. The optical system 22 may be a conventional optical element such as a telescope or a Petzval lens, or a special use optical system, such as a mission-specific optical system.

The aperture-sharing element 28 is attached to a front end 32 of the optical system 22. In the embodiment of FIG. 2, the front end 32 of the optical system 22 is mated with a corresponding portion of the aperture-sharing element 28. For example, the front end 32 and the aperture-sharing element 28 may be mated with a male/female threaded connection and the aperture-sharing element 28 can be attached by screwing the aperture-sharing element 28 onto the front end 32 of the optical system 22. The aperture-sharing element 28 can therefore be removed easily and replaced with a different aperture-sharing element, as may be desired for certain applications or uses. As will be appreciated, the aperture-sharing element 28 and the optical system 22 can be connected or mated in any conventional manner which allows for the easy interchangeability of different aperture-sharing elements. Alternatively, the aperture-sharing element 28 may be connected to the optical system 22 in a permanent or semi-permanent manner.

The aperture-sharing element 28 includes one or more optical elements 28a-c that at least partially surround the optical path 26. In the embodiment of FIG. 2, three optical elements 28a-c are shown surrounding the central optical path 26. The aperture-sharing element 28 may include more or fewer optical elements than shown in FIG. 2. Although illustrated as three optical elements 28a-c connected together in the shape of a ring, the optical elements may be connected together to form a partial ring or a portion of a ring (e.g., a "C" or "U" shape), or another shape. The optical elements 28a-c also may be spaced apart from one another. The optical elements 28a-c may be connected together by a bonding agent or compound, such as glue, an epoxy, or another adhesive.

As shown in FIG. 3A, the aperture-sharing element 28 of FIG. 2 is a ring of optical elements 28a-c that surrounds the central optical path 26. The ring of optical elements 28a-c may be an axisymmetric ring of elements as shown in FIG. 3A or the optical elements may have a different arrangement. It also will be appreciated that the aperture-sharing element 28 also may only partially surround the central optical path 26. A center portion 34 of the aperture-sharing element 28 is hollow. Incoming light from the target object 18, therefore, may pass through the center or hollow portion 34 of the aperture-sharing element 28 and directly to the aperture 24 of the optical system 22. As described with respect to FIG. 5, the center or hollow portion 34 may include one or more filters and/or polarizers to reduce the intensity of the incoming light.

The aperture-sharing element 28 may be a multi-zone prism or a multi-zone mirror. For example, the optical elements 28a-c may include a three-zone mirror or mirror-like elements that reflect light from the peripheral portions 20a-c of the star field 20 through the aperture 24 and to the focal plane 30. Alternatively, the optical elements 28a-c may be may be three-zone wedges or three-zone prisms that are cut from a full aperture prism or other piece of transparent material. Although illustrated in the exemplary embodiment as a three-zone prism or three-zone mirror, the multi-zone prism or mirror may include more or less than the three zones illustrated in FIGS. 2 and 3A.

Optical elements 28b, 28c are shown in the side view of the aperture-sharing element 28 in FIG. 3B. The aperture-sharing element 28 includes a front portion 36 through which the light from the field of view of the aperture-sharing element is received, for example, peripheral portions 20a-c of the star field 20. The aperture-sharing element 28 also includes a rear portion 38 through which the received light is directed through the aperture 24 and to peripheral portions or areas 30a-c of the focal plane 30. The front portion 36 of the aperture-sharing element 28 is angled relative to the rear portion 38 to reflect or to direct the light from the peripheral portions 20a-c of the star field 20 to the peripheral portions or areas 30a-c of the focal plane 30, as shown by the angle θ in FIG. 3B.

Figure 4:
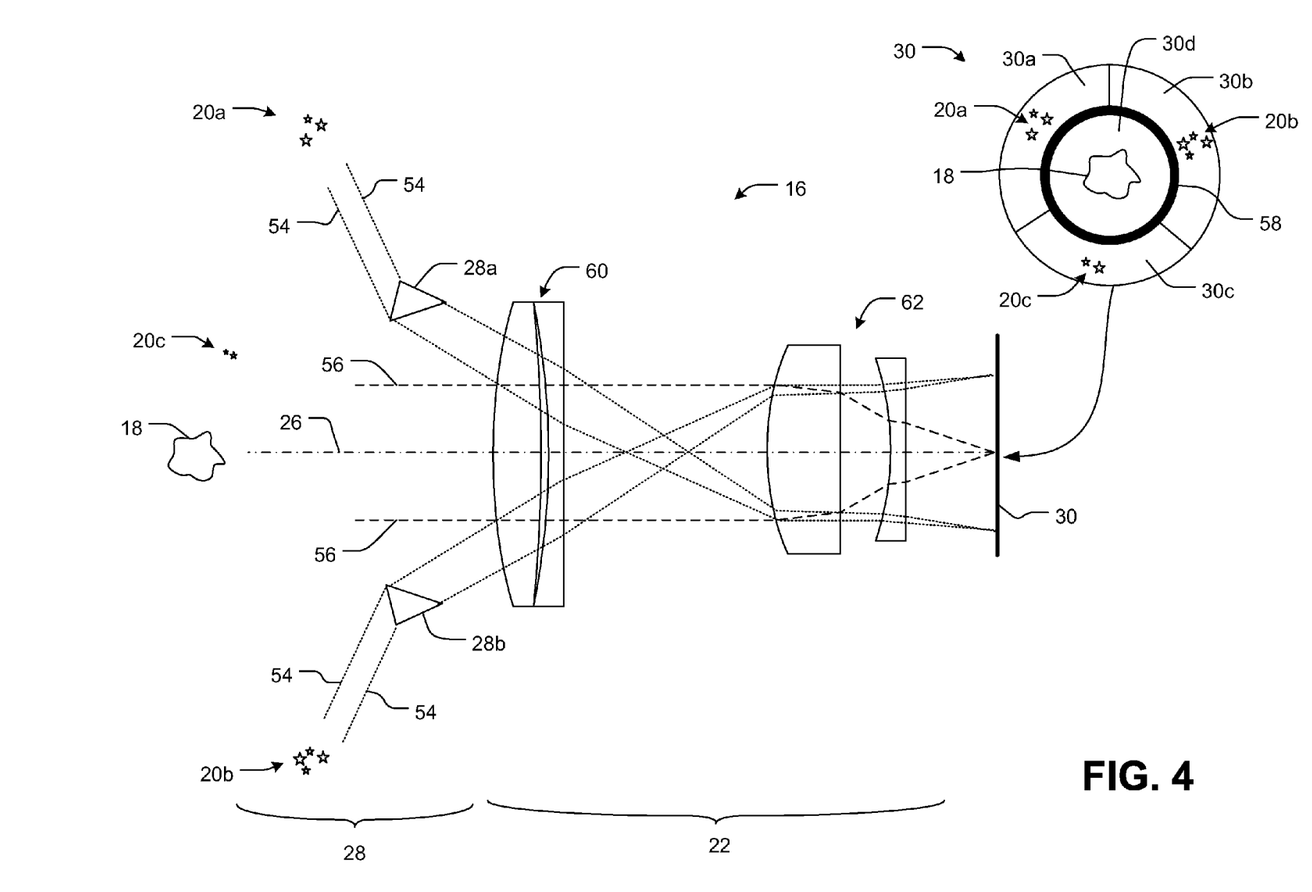
FIG. 4 is a schematic sectional view of an embodiment of an optical apparatus.

The fields of view of the optical system 22 and the aperture-sharing element 28 are shown generally in FIGS. 4 and 5. The aperture-sharing element 28 has a field of view indicated generally by reference numeral 54, and the optical system 22 has a field of view indicated generally by reference numeral 56. The width of the field of view 54 of the aperture-sharing element 28 may be based on a number of different factors, including the material properties of the optical elements 28a-c and the angle θ. The range of the field of view 54 can be increased or be decreased based on the angle θ. For example, a larger angle θ would result in a wider field of view 54 and a smaller angle θ would result in a narrower field of view 54. The field of view 54 of the aperture-sharing element 28 should be wide enough such that the images from the peripheral portions 20a-c of the star field 20 can be used for star tracking to measure the attitude of the satellite 12. Generally, about 20° from the central optical path 26 is sufficient for tracking the position of the star field 20 for measuring the attitude of the satellite 12, however, other angles may also be suitable.

As shown in FIGS. 4 and 5, the field of view 54 of the aperture-sharing element 28 is wider than the field of view 56 of the optical system 22. The field of view 56 of the optical system 22 and the field of view 54 of the aperture-sharing element 28 generally do not overlap with one another. In one embodiment, the field of view 56 of the optical system 22 may be about 3-6° from the central optical path 26 and the field of view 54 of the aperture-sharing element 28 may be offset from the central optical path 26 by between 20-25°.

The resulting image at the focal plane 30, therefore, includes a dark or blank portion 58 between the image at the central portion 30d (e.g., from the optical system 22) and the image at the peripheral portions or areas 30a-c (e.g., from the aperture-sharing element 28). For example, if the field of view 56 of the optical system 22 extends to about 6° from the central optical path 26 and the field of view 54 of the aperture-sharing element 28 begins at about 20° from the central optical path 26, then the dark area 56 between the images would be equivalent to about 14°.

Additional details of the optical apparatus 16 and the image at the focal plane 30 are shown in FIGS. 4 and 5. The optical system 22 and the aperture-sharing element 28 are shown schematically in FIG. 4 to illustrate the paths of the radiation from the target object 18 and the peripheral portions 20a-c through the optical apparatus 16.

The light from the peripheral portions 20a-c of the star field 20 and light from the target object 18 are viewed or imaged simultaneously at the focal plane 30. An exemplary representation of the image at the focal plane 30 is shown in FIGS. 4 and 5. Light from the peripheral portions 20a-c of the star field 20 is directed to a first portion of the focal plane (e.g., portions 30a-c) and light from the target object 18 received along the optical path 26 is directed to a second portion of the focal plane (e.g., central portion 30d). The first portion of the focal plane 30 may include peripheral portions or areas 30a-c corresponding to the optical elements 28a-c. As shown in FIGS. 4 and 5, the light from peripheral portion 20a is directed by optical element 28a to peripheral portion 30a. The light from peripheral portion 20b is directed by optical element 28b to peripheral portion 30b. Similarly, light from the peripheral portion 20c would be received by optical element 28c (FIG. 2) and directed to peripheral portion 30c. The blank or dark portion 58 of the image at the focal plane 30 is representative of the differences in the field of view 54 of the aperture-sharing element 28 and the field of view 56 of the optical system 22 and is a portion of the focal plane 30 in which there is no image.

Each optical element 28a-c in the aperture-sharing element 28 generally functions as a separate camera or sensor for measuring the attitude of the satellite 12. A single camera on a star tracker generally can be used to measure two of the three components of attitude (e.g., roll and pitch, roll and yaw, or pitch and yaw), while two cameras generally can be used to measure all three components of attitude. Thus, to track all three components of attitude, the aperture-sharing element 28 preferably has at least two or more optical elements. The aperture-sharing element 28 may include more optical elements, for example, the three optical elements 28a-c in the illustrated embodiments to allow the attitude of the satellite to be measured even if the field of view for one of the optical elements is blocked or is otherwise unusable. For example, if the satellite is in a low-Earth orbit, Earth temporarily may obstruct the view of one of the optical elements (e.g., optical element 28a). If the remaining optical elements (e.g., optical elements 28b, 28c) are not obstructed, then the attitude of the satellite can still be measured. Additional optical elements may be included in the aperture-sharing element 28, for example, so that the attitude of the satellite 12 can be measured even if two or more of the optical elements are obstructed or unusable.

The optical system 22 and the aperture-sharing element 28 may be tailored to the environment in which the optical apparatus 16 is used (e.g., based upon the orbit of the satellite 12, the specific mission, etc.). For example, if the satellite 12 is being used to image an object near the sun and the position of the satellite 12 relative to the sun generally is constant, then the aperture-sharing element 28 could be configured to image the target object 18 and the star field 20, but not the sun, for example, by arranging the optical elements such that the sun is not in the field of view of the aperture-sharing element 28.

Multi-axis stellar attitude measurements can be made by comparing the positions of the stars imaged at the peripheral portions 30*a-c* of the focal plane 30. As the attitude of the satellite 12 changes, the positions of the stars in the image of each peripheral portion 20*a-c* of the star field 20 will change. These changes are indicative of the changes in the attitude of the satellite 12. By comparing the positions of the stars in one image to an image of the same stars in a later image, it is possible to determine how the attitude of the satellite 12 changed, for example, how much the roll, pitch, and/or yaw of the satellite has changed. Adjustments can then be made to maintain the aim of the optical system 22 at the desired target object 18, for example, by correcting the attitude of the satellite 12 or by adjusting the aim of the optical system 22.

To effectively track the positions and changes in positions of the stars in the star field 20, the images of the peripheral portions 20*a-c* of the star field 20 at the focal plane 30 should have a low distortion (e.g., the image should not be substantially distorted). Having an image with low distortion reduces the processing requirements and to keep the angular sensitivity of the system roughly constant. For example, small changes in the position of the stars in distorted images may translate to large changes in the attitude of the satellite, but such changes may not be easily measured from distorted images. Therefore, images from lenses that distort images, for example, images from a fisheye lens, generally are not reliable for measuring changes in the attitude of the satellite and require significant processing to remove the errors in position introduced by the optical system distortion.

The aperture-sharing element 28 and optical system 22 described herein do not substantially distort the light from the star field 20. The light from the peripheral portions 20*a-c* of the star field 20 therefore can be used to track the stars in the star field 20 to measure the attitude of the satellite 12. Thus, unlike lenses that distort incoming light, the aperture-sharing element 28 can be used to provide multi-axis stellar attitude measurements.

As described above, different aperture-sharing elements may be placed on the common optical system 22. Thus, the aperture-sharing element may be mission or orbit specific, or may be customized based upon the observation geometry of the star field or target object and the desired throughput to the optical system 22 and focal plane 30. For example, an aperture-sharing element 28 with a wider or narrower field of view 54 may be attached to the optical system 22 according to the characteristics of the star field 20 and the stars being tracked to measure the attitude of the satellite.

The optical system 22 shown in FIGS. 4 and 5 is a Petzval optical design form, which may, for example, include a cemented doublet 60 (e.g., two simple lenses attached together) and an air-spaced doublet 62 (e.g., two simple lenses that utilize an external fixture, rather than adhesive, to hold them together).

The image at the focal plane 30 may be acquired and/or analyzed by an acquisition sensor, such as a camera, for example. The acquisition sensor may have an adjustable integration time, which is the amount of time that the sensor gathers light for the image (e.g., shutter speed in a conventional camera). The length of the integration time will affect the exposure of the resulting image. For example, if the object is far away or is dimly lit, a longer integration time may be desirable to allow more light into the sensor for imaging the target. If the object is brighter or closer, then a lower integration time may be desirable to avoid oversaturation of the image.

Generally, the intensity of the light from the star field 20 remains constant because the stars in the star field 20 are far away from the satellite 12. The intensity of the light from the target object 18 generally is not constant and may increase or decrease, for example based upon the distance of the target object 18 to the satellite 12. In some circumstances, the optimal integration time for imaging the star field 20 and the optimal integration time for imaging the target object 18 may be different. For example, the optimal integration time for the star field 20 may cause an oversaturation of the target object 18, and the optimal integration time for the target object 18 may be too short to image the star field 20.

The optical apparatus 16 may include an optical assembly 63 in the aperture-sharing element 28 for dynamic range imaging when the target object 18 and the star field 20 have different integration times, for example, to image a target object 18 that is brighter than the star field 20. As shown in FIGS. 2 and 5, the optical assembly 63 may include variable attenuation elements, for example, such as one or more polarizers 64, 66, and/or discrete attenuation elements, for example, such as one or more neutral density filter 68 (also referred to as an "ND filter"). The attenuation elements are located along the optical path used for imaging the target object 18. For example, as shown in FIGS. 2 and 5, the polarizers 64, 66 and the ND filter 68 are located along the central optical path 26. The polarizers 64, 66 and ND filter 68 may be integrated into the aperture-sharing element 28. For example, the polarizers 64, 66 and the ND filter 68 may be contained within the center portion 34 of the aperture-sharing element 28. Because the intensity of the star field 20 generally is less than the intensity of the target object 18, only the light from the target object 18 is filtered by the polarizers 64, 66 and/or the ND filter 68. The intensity light from the target object 18 can be reduced such that the integration time for both the target object 18 and the star field 20 is about the same, which facilitates the imaging of both the target and the star field at the common focal plane 30. Balancing the signals of the central object with the stellar objects prior to entering the optical system reduces scattering in wide field of view optics and will reduce contamination of the stellar images by a potentially brighter central object.

The amount of light allowed into the optical apparatus 16 and to the focal plane 30 can be controlled by rotating one polarizer 64 relative to the other polarizer 66. The polarizers 64, 66 can be rotated with respect to one another by a motor or other mechanical implement. When the linear polarizers 64, 66 are aligned, the incoming light reaches the focal plane 30 at the full intensity. As one linear polarizer 64 is rotated relative to the other linear polarizer 66, the amount of incoming light that reaches the focal plane 30 is reduced. It will be appreciated that rather than a mechanically rotatable polarizer, the polarization of the incoming light may be rotated electronically, for example, with an adjustable circular retarder.

The intensity of the light along the central optical path 26 also can be reduced by filtering the light through the ND filter 68. The ND filter 68 reduces the intensity of the incoming light an even amount across the entire light spectrum. The ND filter 68 may be used to reduce the overall intensity of the incoming light along the central optical path 26 by large amounts. For example, the ND filter 68 may reduce the light by about 90%, such that only about 10% of the incoming light from the target object 18 reaches the focal plane 30.

The ND filter 68 and polarizers 64, 66 may be rotated, slid or flipped in and out of the central optical path 26, for example, depending upon the intensity of the light from the target object 18. For example, if the intensity of the light radiated from the target object 18 is greater than the intensity of the light from the star field 20, the ND filter 68 can be rotated into the central optical path 26 to reduce the intensity of the light from the target object 18. If the intensity of the light from the target object 18 is the about the same as the intensity of the light from the star field 20, then the ND filter may be rotated out of the central optical path 26 so that the light is imaged at the focal plane at full intensity. As shown in FIG. 2, the ND filter 68 may be rotated from a first position, indicated by solid lines, to a second position, indicated by dashed lines. In another embodiment, shown in FIG. 5, two ND filters 68 are movable between the first position (indicated by solid lines) and the second position (indicated by dashed lines).

Although only a single ND filter 68 is shown, it will be appreciated that the optical apparatus 16 may include additional ND filters, for example, a ND filter that reduces all but 50% of the intensity of the incoming light, a ND filter that reduces all but 10% of the intensity of the incoming light, and a ND filter that reduces all but 1% of the intensity of the incoming light, etc. The ND filters may be slid into and out of the central optical path 26 as desired or needed based upon the relative intensities of the target object 18 and the star field 20.

The ND filter 68 can be used for macroscopic reductions in the intensity of the incoming light and the linear polarizers 64, 66 can be used for smaller reductions in the intensity of the light. For example, the optical apparatus 16 may include a ND filter that reduces the intensity of the incoming light by 90% such that 10% of the incoming light along the central optical path 26 reaches the focal plane 30. The linear polarizers 64, 66 can be used to incrementally reduce the intensity of the light further, for example such that 9% of the incoming light reaches the focal plane. The linear polarizers 64, 66, could be rotated further to reduce the intensity of the light that reaches the focal plane, for example, to reduce the intensity by 8%, 5%, 2%, etc.

Accordingly, the optical apparatus 16 can be used to image both the target object 18 and peripheral portions 20*a-c* of the star field 20 at the same focal plane 30 and with the same sensor.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical apparatus for measuring the attitude of an object in outer space comprising:
    an optical system that includes an aperture to receive optical radiation and a focal plane to image the optical radiation; and
    an aperture-sharing element attached to the optical system and at least partially surrounding an optical path into the aperture, wherein the aperture-sharing element directs optical radiation from a field of view of the aperture-sharing element to a corresponding first portion of the focal plane to provide multi-axis stellar attitude measurements.

2. The optical apparatus of claim 1, wherein the aperture receives optical radiation along the optical path and directs the optical radiation to a second portion of the focal plane.

3. The optical apparatus of claim 2, wherein the optical path is a central optical path into the aperture, and the field of view of the aperture-sharing element is a peripheral field of view.

4. The optical apparatus of claim 1, wherein the aperture-sharing element comprises a plurality of optical elements and each optical element directs optical radiation from a different portion of the field of view of the aperture-sharing element to a corresponding area of the first portion of the focal plane.

5. The optical apparatus of claim 4, wherein the plurality of optical elements are axisymmetrical around the optical path.

6. The optical apparatus of claim 5, wherein the plurality of optical elements comprise a multi-zone prism or a multi-zone mirror.

7. The optical apparatus of claim 1, wherein the field of view of the aperture-sharing element is angularly offset from the optical path.

8. The optical apparatus of claim 1, wherein the optical radiation from the field of view of the aperture-sharing element is not substantially distorted at the focal plane.

9. The optical apparatus of claim 1, wherein the aperture-sharing element directs optical radiation from the field of view of the aperture-sharing element, which is external to the optical apparatus, to the corresponding first portion of the focal plane.

10. An optical apparatus for measuring the attitude of an object in outer space comprising:
    an optical system including an aperture and a focal plane, the focal plane having a center portion for imaging optical radiation received along a central optical path and a peripheral portion for imaging optical radiation from a peripheral field of view; and
    an aperture-sharing element connected to the optical system and at least partially surrounding the central optical radiation path, the aperture-sharing element directing optical radiation from the peripheral field of view to the peripheral portion of the focal plane.

11. The optical apparatus of claim 10, wherein the optical radiation from the aperture-sharing element provides multi-axis stellar attitude measurements.

12. The optical apparatus of claim 10, wherein the aperture-sharing element further comprises a plurality of optical elements that each direct optical radiation from different areas of the peripheral field of view to corresponding peripheral portions of the focal plane.

13. The optical apparatus of claim 12, wherein the aperture-sharing element comprises a multi-zone prism or a multi-zone mirror.

14. The optical apparatus of claim 10, further comprising an optical assembly to control the intensity of optical radiation received by the optical system along the central optical path.

15. The optical apparatus of claim 14, wherein the optical assembly includes at least one variable attenuation element and/or at least one discrete attenuation element.

16. The optical apparatus of claim 15, wherein the variable attenuation element comprises at least two polarizers and the discrete attenuation element comprises a neutral density filter.

17. The optical apparatus of claim 16, wherein the neutral density filter is movable between a first position and a second position, wherein the optical radiation received along the central optical path is filtered through the neutral density filter in the first position and the optical radiation received along the central optical path is not filtered through the neutral density filter in the second position.

18. The optical apparatus of claim 17, wherein the at least two polarizers include a fixed polarizer and a rotating polarizer, wherein the rotating polarizer is rotatable relative to the fixed polarizer to change the polarization of the optical radiation received along the central optical path.

19. The optical apparatus of claim 10, wherein the aperture-sharing element directs optical radiation from the peripheral field of view, which is external to the optical apparatus, to the to the peripheral portion of the focal plane.

20. A method of measuring the attitude of an object in outer space comprising:
   receiving optical radiation from a peripheral field of view and directing optical radiation from the peripheral field of view to a first portion of a focal plane with an aperture-sharing element that at least partially surrounds an aperture of an optical apparatus;
   receiving optical radiation along a central optical path through the aperture of the optical apparatus and directing the optical radiation to a second portion of the focal plane;
   imaging the optical radiation from the peripheral field of view at the first portion of the focal plane and imaging the optical radiation from the central optical path at the second portion of the focal plane; and
   providing multi-axis stellar attitude measurements with the optical radiation imaged at the first portion of the focal plane.

21. The method of claim 20, wherein directing optical radiation from the peripheral field of view comprises directing the optical radiation from a plurality of different areas of the peripheral field of view to corresponding peripheral portions of the focal plane.

22. The method of claim 20, further comprising filtering the optical radiation received along the central optical path before imaging the optical radiation at the second portion of the focal plane.

23. The method of claim 22, wherein the filtering comprises filtering the optical radiation received along the central optical path if the intensity of the optical radiation along the central optical path is greater than the intensity of the optical radiation from the peripheral field of view.

24. The method of claim 23, further comprising polarizing the optical radiation received along the central optical path before imaging the optical radiation at the second portion of the focal plane.

25. The method of claim 20, wherein the receiving optical radiation from the peripheral field of view includes receiving the optical radiation from a peripheral field of view that is external to the apparatus.

\* \* \* \* \*